Patented Sept. 30, 1947

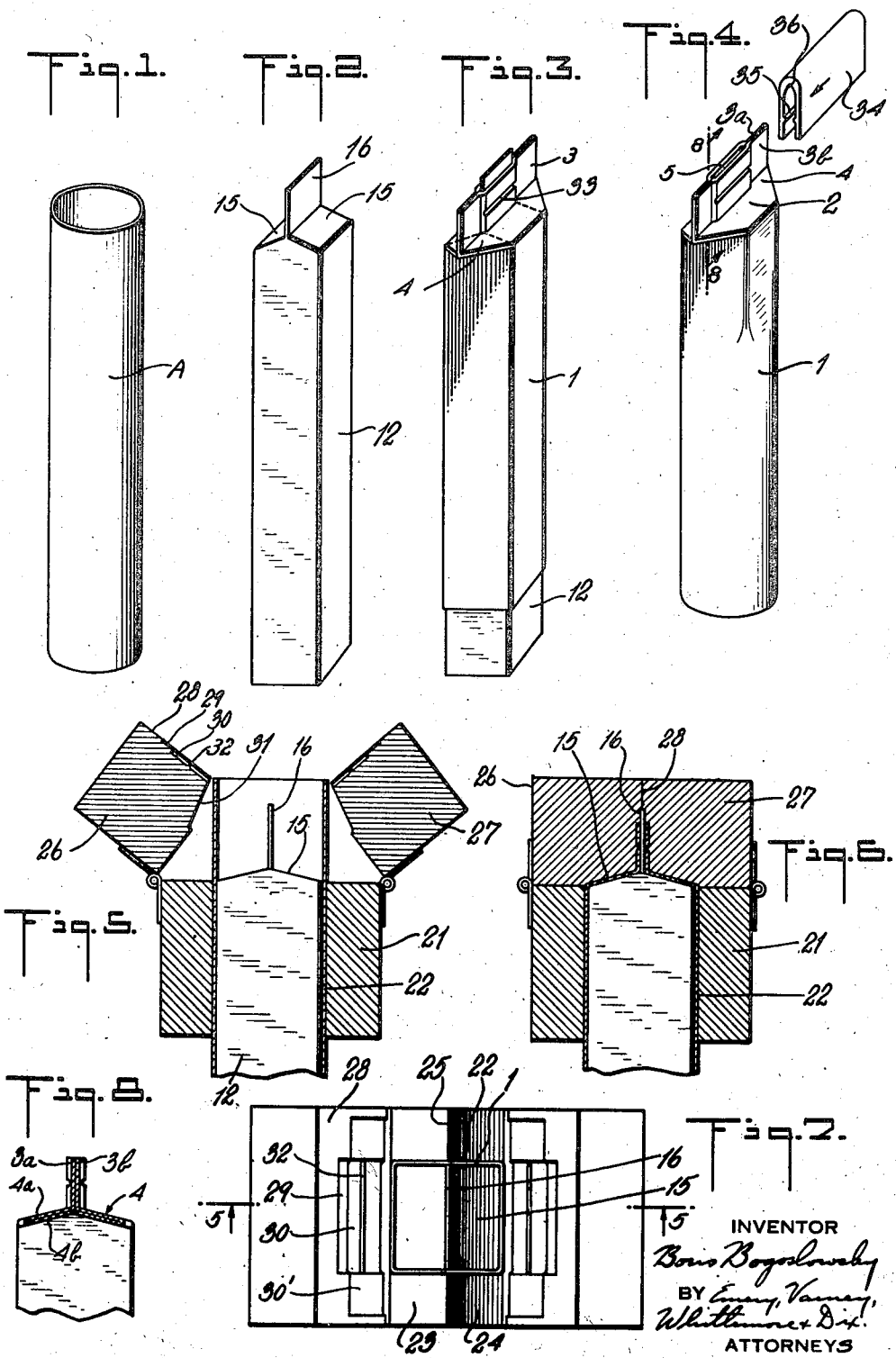

2,428,261

UNITED STATES PATENT OFFICE 2,428,261

COLLAPSIBLE TUBE

Boris Bogoslowsky, Jackson Heights, N. Y.

Application July 8, 1943, Serial No. 493,843

2 Claims. (Cl. 222—107)

This invention relates to collapsible tubes and to methods for the manufacture thereof.

Collapsible tubes are used for packaging and dispensing many articles of commerce, as for example, tooth paste, shaving cream, cosmetic preparations, food, glue and cement, paint, polishes and the like. In the past such tubes have been generally made of metal, such as tin, aluminum and lead, and have been shaped from blanks by extrusion processes.

It is an object of the present invention to provide a collapsible tube made from a tubular blank as hereinafter described, and to provide suitable methods and apparatus for forming such collapsible tubes.

Other objects and advantages of the invention will appear hereinafter.

A preferred embodiment of the invention selected for purposes of illustration is shown in the accompanying drawings, in which, Figure 1 is a perspective view of a tubular blank.

Figure 2 is a perspective view of a forming mandrel.

Figure 3 is a perspective view showing the tubular blank on the mandrel and folded to form the shoulder and neck.

Figure 4 is a perspective view of the finished tube and closure therefor.

Figure 5 is a section on the line 5—5 of Figure 7 showing the mold blocks open, prior to the forming operation.

Figure 6 is a similar view showing the mold blocks closed during the forming operation.

Figure 7 is a top plan view of the mold blocks in the open position shown in Figure 5, and Figure 8 is an enlarged section on the line 8—8 of Figure 4.

As materials for the manufacture of collapsible tubes according to my invention, I may use many of the plastic materials now available in the commercial market as for example the cellulose base films such as cellulose acetate or the commercial product "Cellophane" or resin base films such as the commercial products "Vinylite" or "Saran" or rubber base films such as the commercial product "Pliofilm," or I may use paper or other sheet materials for some purposes, or I may use combinations of two or more plastic films of different characteristics, or combinations of plastic films with paper sheets for some purposes. The selection of a suitable material will depend on the nature of the contents to be packaged in the tube formed therefrom, but I prefer to use a thermoplastic or heat sealing material, or in the case of paper or other materials which are non-thermoplastic or non-heat sealing, I prefer to coat or laminate the same with a thermoplastic or heat sealing material, because such materials lend themselves particularly well to a simple method of manufacture as hereinafter explained.

In practicing the invention hereinafter described, I prefer to start with the selected material in the form of cylindrical tubular blanks A, as shown in Figure 1, cut to the desired length. It is possible to obtain some of the above-named plastic films in the form of extruded seamless tubing, and I may employ such tubing in carrying out my invention. However, it is also possible to form cylindrical tubular blanks from flat sheet or strip materials, as by rolling the same convolutely and sealing the formed tube along a longitudinal seam, or by spiral winding and sealing the overlapping windings of material. The formation of such tubular blanks forms no part of the present invention.

Referring to Figures 4 and 8, the finished collapsible tube comprises a tubular body 1, shoulders 2 and a neck 3. The upper portion of the tubular body is preferably square or rectangular in cross-section and the shoulders extend inwardly from opposite sides thereof, meeting at a juncture point from which the neck extends vertically upward, parallel to the front and back of the tube, centrally therebetween.

The neck comprises two parallel plies 3a and 3b of material extending transversely across the tube and projecting beyond the outlines of the tubular body at both ends. Likewise, the shoulders project beyond the outlines of the tubular body at both ends in the form of overhanging webs 4, each consisting of two parallel plies 4a and 4b, the upper ply 4a of which constitutes a continuation of the main portion of the shoulder, i. e. the portion lying within the outlines of the tubular body, and the lower ply 4b of which folds inwardly and merges into the tubular body. The abutting surfaces of the parallel plies of the neck are left unsealed along at least a portion of the length of the neck in order to provide a passage 5 through which the contents of the tube may be discharged by application of pressure to the tubular body portion. On the other hand, the abutting surfaces of the parallel plies of the overhanging webs 4 are sealed together to cause the shoulder and neck to retain their shape when pressure is applied to the tube. The abutting surfaces of the plies of the neck may also be sealed along those portions of the length of the neck which are not required for the passage 5.

The entire collapsible tube, including the tubular body portion, shoulders, webs and neck are formed integrally from a tubular blank as above referred to. One method of forming such an integral tube is described hereinafter, and reference may be had to that description for further details of the construction of such tubes.

Referring to Figures 2 and 3, I place a tubular blank of the selected material on a mandrel 12 preferably having a square or rectangular cross section. The upper end of the mandrel 12 terminates in oppositely disposed end surfaces 15 which may be inclined as shown. Inserted in the mandrel and extending vertically upward from the point of intersection of the inclined surfaces 15 is a tongue 16, the purposes of which will be described hereinafter. In placing the tubular blank on the mandrel, the blank, which should be of dimensions such as to fit snugly around the mandrel, is caused to assume a square or rectangular shape and the upper end of the blank is allowed to protrude beyond the surfaces 15 to provide a suitable length of unsupported material for folding as hereinafter described.

After the blank is so placed, the front and back walls are folded inwardly, i. e. toward each other as shown in Figure 3, in order to form the neck 3 and the shoulders 2. At the same time, the side walls of the blank immediately below the neck are folded inwardly to form the lower ply of the webs 4. It will be observed, however, that the parallel plies of the neck are spaced apart by the tongue 16 along a substantial portion of the length of the neck, in this case along a distance equal to the width of the mandrel. The said tongue thus separates the parallel plies of the neck, preventing any adhesion therebetween so that when the mandrel and tongue are withdrawn, there is a passage 5 from the interior of the tube to the exterior.

If the tubular blank is made of thermoplastic or heat sealing material, or of sheet or film material coated or laminated with thermoplastic or heat sealing material, it will be obvious that if heat and pressure are applied to the neck and webs folded and formed as described, the abutting surfaces of the plies of material may be tightly sealed to one another. Thus the upper ply of each of the webs 4 constituting an extension of the shoulder will be sealed to the abutting surfaces of the inwardly folded lower ply of said webs. Furthermore, the abutting surfaces of the parallel plies of the neck will be sealed together at the ends of the neck along those portions which are not spaced apart by the tongue 16.

A simple form of apparatus for accomplishing the folding and forming operations is shown in Figures 5, 6 and 7. Such apparatus comprises a mold block 21 having an aperture 22 therein of a size and shape to receive the mandrel 12 carrying the blank 1 to be folded and formed. The upper surface of said block is provided with inclined surfaces 23, 24 intersecting in an edge 25, the inclination of said surfaces being the same as the inclination of the end surfaces 15 of the mandrel so that when the mandrel is inserted in the aperture 22, as shown in Figure 5, the inclined surfaces 23, 24 are in position to support the webs 4.

A pair of additional mold blocks 26, 27 are pivotally mounted on the block 21, the vertical faces 28 of said blocks having shallow recesses 29 formed therein to receive the projecting end of the tongue 16, and somewhat deeper recesses 30, 30' to accommodate and form the material of the neck. The bottom faces 31 of said blocks cooperate with the end surfaces 15 of the mandrel to form the tube shoulder and also cooperate with the surfaces 23, 24 to form the webs 4.

In making a collapsible tube, a tubular blank is first placed on the mandrel 12 and the mandrel and blank are then inserted into the aperture 22 as shown in Figure 5. The blocks 26, 27 are then moved to the position shown in Figure 6 to fold the unsupported end of the blank to form the neck, shoulders and webs of the tube. Then while holding the blocks and mandrel firmly, as in a press, pressure may be applied horizontally to the neck of the tube and vertically to the shoulder and webs. The blocks may be heated in any suitable manner, electrically or otherwise, to seal the abutting plies of the webs and of the neck, except where the plies of the neck are spaced by the tongue 16, and after cooling the mold blocks, the finished tube may be removed from the blocks and the mandrel. If it is desired to provide extra stiffness in the shoulder and neck portions of the tube, it is possible to supply extra thermoplastic material, which when formed and molded as above described provides extra thickness in those portions of the tube. This may easily be done by wrapping suitable thermoplastic material around the end of the tubular blank prior to folding and forming, or such material may be added at the places where such extra stiffness may be desired after folding but prior to applying heat to the mold blocks.

If desired, the recesses 30 of the blocks 26 and 27 may be provided with horizontal ridges 32 adapted to form parallel grooves 33 in the neck of the tube. Such grooves may be used as guides for a closure member 34 particularly adapted for use in connection with such tubes. Such closure member is channel shaped and the inside walls of the channel are provided with ridges 35 adapted to engage the grooves 33. The upper portions of the inside walls of the channel converge sharply to form a V-shaped groove 36, which, when the closure is applied to the tube, pinches the upper edges of the plies of the neck together and forms a very tight seal.

It will be understood that the invention may be variously modified and embodied within the scope of the subjoined claims.

I claim as my invention:

1. A collapsible tube comprising a tubular body of material having oppositely disposed portions adjacent one end thereof folded inwardly to form oppositely disposed shoulders and folded upwardly from said shoulders to form two parallel plies of material constituting a neck, said neck having a passageway therethrough to permit the contents of the tube to be discharged, said neck having portions extending laterally from said passageway on each side thereof and projecting beyond the outlines of the tubular body, and said shoulders having portions extending laterally from said passageway on each side thereof and projecting beyond the outlines of the tubular body in the form of webs, each web consisting of two parallel plies, the upper ply constituting a continuation of the main portion of the shoulder which lies within the outlines of the tubular body, and the lower ply being folded inwardly and merging into the tubular body, the entire area of the abutting surfaces of the upper and lower plies of said webs being sealed together, and the entire area of the abutting surfaces of the parallel plies of the neck being sealed together along the laterally extending portions thereof.

2. A collapsible tube comprising a tubular body of material having oppositely disposed portions adjacent one end thereof folded inwardly to form oppositely disposed shoulders and folded upwardly from said shoulders to form two parallel plies of material constituting a neck, said neck having a passageway therethrough to permit the contents of the tube to be discharged, the plies of material constituting said neck being of a length greater than the diameter of the tube and being sealed together along the entire area of the abutting surfaces lying on each side of said passageway, the sealed portions of said neck projecting outwardly beyond the outlines of said tubular body on both sides thereof, both sides of said tubular body being folded inwardly beneath the ends of said neck and the entire area of said inwardly folded sides being sealed to the under surfaces of said shoulders beyond the outlines of said tubular body.

BORIS BOGOSLOWSKY.

REFERENCES CITED

The following references are of record in the file of this patent:

UNITED STATES PATENTS

| Number | Name | Date |
| --- | --- | --- |
| 1,756,919 | Becker et al. | Apr. 29, 1930 |
| 1,526,782 | Fleischer | Feb. 17, 1925 |
| 1,690,654 | Trotter | Nov. 6, 1928 |
| 2,268,462 | Sacksenroder et al. | Dec. 30, 1941 |
| 1,716,547 | Geake | June 11, 1929 |
| 2,297,375 | Vogt | Sept. 29, 1942 |
| 2,305,631 | Moore | Dec. 22, 1942 |

FOREIGN PATENTS

| Number | Country | Date |
| --- | --- | --- |
| 24,237 | Great Britain | Dec. 17, 1914 |